United States Patent [19]

Linhart et al.

[11] Patent Number: 4,778,840
[45] Date of Patent: Oct. 18, 1988

[54] STABILIZED POLYPROPYLENE

[75] Inventors: Helmut Linhart, Reinach; Paul Moser, Riehen, both of Switzerland

[73] Assignee: Ciba-Geigy Corporation, Ardsley, N.Y.

[21] Appl. No.: 96,286

[22] Filed: Sep. 11, 1987

Related U.S. Application Data

[63] Continuation of Ser. No. 545,557, Oct. 26, 1983, abandoned, which is a continuation of Ser. No. 141,459, Apr. 18, 1980, abandoned, which is a continuation of Ser. No. 973,061, Dec. 26, 1978.

[30] Foreign Application Priority Data

Jan. 9, 1978 [CH] Switzerland ............................ 181/78

[51] Int. Cl.$^4$ ................................................ C08K 5/53
[52] U.S. Cl. ........................................ 524/131; 524/305
[58] Field of Search ........................................... 524/131

[56] References Cited

U.S. PATENT DOCUMENTS

| | | | |
|---|---|---|---|
| 3,310,575 | 3/1967 | Spivack | 260/45.75 R |
| 3,801,681 | 4/1974 | Grayson | 260/953 |
| 4,024,103 | 5/1977 | Heinrich et al. | 260/45.7 |
| 4,076,690 | 2/1978 | Rosenberger | 260/45.95 |

FOREIGN PATENT DOCUMENTS 2361407  3/1978  France .
2517226  10/1975  Fed. Rep. of Germany .

*Primary Examiner*—Veronica P. Hoke
*Attorney, Agent, or Firm*—Harry Falber

[57] ABSTRACT

Polypropylene compositions containing as stabilizer at least one compound of the formula I

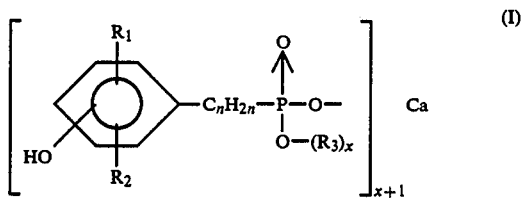

in which
x is 0 or 1,
n is 1, 2, 3 or 4,
$R_1$ is $C_1$–$C_6$ alkyl,
$R_2$ is hydrogen or $C_1$–$C_6$ alkyl, and
$R_3$ is $C_1$–$C_{30}$ alkyl.

2 Claims, No Drawings

STABILIZED POLYPROPYLENE

This application is a continuation of application Ser. No. 545,557, filed Oct. 26, 1983, now abandoned, which is a continuation of application Ser. No. 141,459, filed on Apr. 18, 1980, now abandoned, which in turn is a continuation of application Ser. No. 973,061, filed on Dec. 26, 1978, now abandoned.

The present invention relates to the use of calcium salts of phosphonic acids or half-esters thereof for stabilising polypropylene; and also to the polypropylene stabilised by means of these calcium salts against the harmful effect of light and heat.

The use of metal salts of phosphonic acids or of half-esters thereof for stabilising organic material is known from the U.S. Pat. No. 3,310,575. The compounds described therein have the technical disadvantage that the substrate to be protected frequently has an unpleasant inherent colour after incorporation of these additives. Furthermore, it has been shown in Example 3 of the German Offenlegungsschrift No. 2,517,226 that the calcium salts of phosphonic acids or half-esters thereof are inferior to the analogous compounds not present as salts with respect to their effectiveness as stabilisers in low pressure polyethylene.

It has now been found not only that the calcium salts to be used according to the invention do not impart to the polypropylene to be protected an unpleasant inherent colour, but also that in polypropylene the effectiveness of the calcium salts is greater than that of the analogous phosphonic acids or half-esters thereof not present as salts.

The invention relates therefore to polypropylene compositions containing at least one compound of the formula I

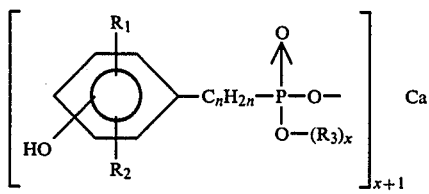

in which
x is 0 or 1,
n is 1, 2, 3 or 4,
$R_1$ is $C_1$–$C_6$ alkyl,
$R_2$ is hydrogen or $C_1$–$C_6$ alkyl, and
$R_3$ is $C_1$–$C_{30}$ alkyl.

As $C_1$–$C_6$ alkyl, $R_1$ and $R_2$ are for example methyl, ethyl, isopropyl, t-butyl, neopentyl, t-pentyl or isohexyl. Preferably one, but particularly preferably both, of the radicals $R_1$ and $R_2$ is (are) in the ortho-position with respect to the hydroxyl groups. Of particular importance are compounds which possess one or two t-butyl groups in the ortho-position with respect to the hydroxyl groups.

As $C_1$–$C_{30}$ alkyl, $R_3$ can be for example methyl, ethyl, n-propyl, isopropyl, n-butyl, sec-butyl, t-butyl, n-pentyl, neopentyl, n-hexyl, n-octyl, t-octyl, 2-ethylhexyl, n-decyl, n-dodecyl, n-tetradecyl, n-hexadecyl, n-octadecyl, n-eicosyl, n-docosyl or triacontyl. $R_3$ is preferably $C_1$–$C_{18}$ alkyl.

n can be 1, 2, 3 or 4. Preferred compounds are those wherein n is 1 or 2, and more especially those wherein n is 1.

The preferred meaning of x is 1.

Compounds to be emphasised are those corresponding to the formula Ia

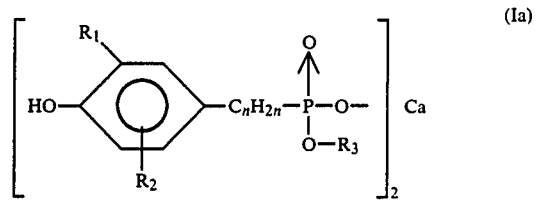

in which n, $R_1$, $R_2$ and $R_3$ have the meanings defined above.

Preferred compounds are those of the formula Ib

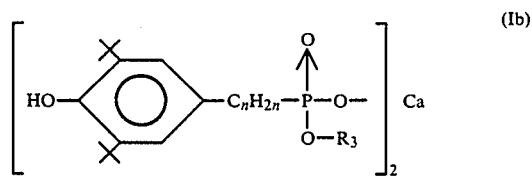

in which n and $R_3$ have the meanings defined above and + is t-butyl.

Particularly preferred compounds correspond to the formula Ic

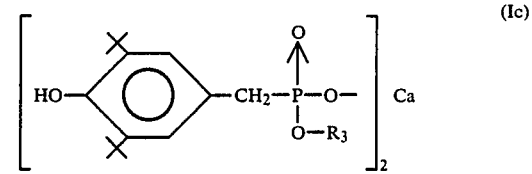

in which $R_3$ and + have the meanings defined above.

The following may be mentioned as examples of compounds of the general formula I:
calcium-bis-[O-ethyl-(3,5-di-t-butyl-4-hydroxybenzyl)-phosphonate],
calcium-bis-[O-n-butyl-(3,5-di-t-butyl-4-hydroxybenzyl)-phosphonate],
calcium-bis-[O-n-octyl-(3,5-di-t-butyl-4-hydroxybenzyl)-phosphonate],
calcium-bis-[O-n-dodecyl-(3,5-di-t-butyl-hydroxybenzyl)-phosphonate],
calcium-bis-[O-n-octadecyl-(3,5-di-t-butyl-4-hydroxybenzyl)-phosphonate],
calcium-bis-[O-ethyl-β-(3,5-di-t-butyl-4-hydroxyphenyl)ethyl-phosphonate],
calcium-bis-[O-ethyl-β-(3-methyl-5-t-butyl-4-hydroxyphenyl)-ethyl-phosphonate] and
calcium-bis-[O-ethyl-(3,5-diisopropyl-4-hydroxybenzyl)-phosphonate].

The compounds of the formula I are produced in a known manner, and can be obtained by methods analogous to those described in U.S. Pat. No. 3,310,575. Thus, for example, a phosphonic acid or a half-ester thereof of the formula II

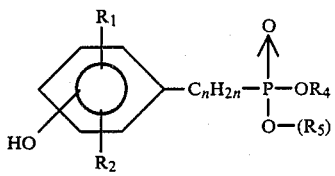

(II)

in which n, $R_1$ and $R_2$ have the meanings already defined, $R_4$ is hydrogen or sodium, and $R_5$ is hydrogen, sodium or $R_3$, where $R_3$ has the meaning given above, is reacted in water or in a water/alcohol mixture with a calcium salt. If the starting material used is the free phosphonic acid or a half-ester thereof, a suitable calcium salt is calcium oxide, calcium hydroxide or calcium carbonate; if however the starting materials used are the corresponding calcium salts, then all calcium salts sufficient soluble in water or in mixtures thereof with alcohols, such as methanol, ethanol, isopropanol or butanol, are suitable. Examples of calcium salts which can be used are calcium chloride, bromide, nitrate or acetate. The compounds of the formula II are known. The production of these compounds is well known to those skilled in the art, and is carried out for example in the manner described in Houben-Weyl 12, (1), 410.

The compounds to be used according to the invention are suitable for stabilising polypropylene. This can essentially be in any desired form, such as moulding compounds, cable insulating materials, etc . . . . Compounds which are preferred and which by virtue of their good antioxidative and colouring properties are particularly suitable, for example as additives to polypropylene fibres, filaments or films, are the calcium phosphonates. The calcium phosphonates display their high effectiveness however also in polypropylene copolymers obtained by copolymerisation of polypropylene with, for example, α-olefins, such as ethylene, 1-butene, 1-hexene or 1-octene. The propylene part in this case is preferably more than 70%.

The incorporation of the calcium phosphonates is effected by using customary methods, for example by dry mixing the polymer with at least one of the calcium phosphonates to be used according to the invention, and subsequent processing in a kneader, mixing rolls or extruder. The additives mentioned can also be applied in the form of a solution or dispersion to the polymers, with the solvent being then evaporated off.

Preferably, 0.01 to 1 percent by weight, and particularly 0.05 to 0.2 percent by weight, of the additive, relative to the substrate to be protected, is incorporated.

The calcium phosphonates to be used according to the invention can be used on their own or together with customary additives. When additive mixtures are used, synergistic effects can occur. The following are examples of further additives which can be employed:

1. Phenolic antioxidants, such as
(a) simple 2,6-dialkylphenols, for example 2,6-di-t-butyl-4-methylphenol;
(b) bisphenols, for example 1,1,3-tris-(5-t-butyl-4-hydroxy-2-methylphenyl)-butane or 4,4'-thiobis-(6-t-butyl-3-methylphenol);
(c) hydroxybenzyl aromatics, for example 1,3,5-tris-(3,5-di-t-butyl-4-hydroxybenzyl)-isocyanurate or 1,3,5-tri-(3,5-di-t-butyl-4-hydrobenzyl)-2,4,6-methylbenzene;
(d) esters of β-(3,5-di-t-butyl-4-hydroxyphenylpropionic acid with mono- or polyhydric alcohols, such as with octadecanol, thiodiethylene glycol or pentaerythritol.

2. UV Absorbers, such as 2-(2'-hydroxyphenyl)-benzotriazoles, 2,4'-bis-(2'-hydroxyphenyl)-6-alkyl-s-triazines, 2-hydroxybenzophenones, 1,3-bis-2-(2'-hydroxybenzoyl)-benzenes, esters of unsubstituted or substituted benzoic acids, acrylates, nickel compounds, sterically hindered amines or oxalic acid diamides.

3. Metal deactivators, such as N,N'-bis-salicyloylhydrazine.

4. Phosphites, such as tri-(nonylphenyl)-phosphite or tris-(2,4-di-t-butylphenyl)-phosphite.

5. Compounds which break down peroxide, such as the esters of β-thiodipropionic acid.

6. Other additives, such as lubricants, emulsifiers, pigments, optical brighteners, flameproofing agents or antistatics.

Examples of further additives together with which the stabilisers usable according to the invention can be employed are to be found in German Offenlegungsschrift No. 2,427,853 on pages 18-24.

The invention is further illustrated in the following Examples. Percentages (%) therein denote percentages by weight, calculated relative to the material to be stabilised.

EXAMPLE 1

Production of calcium-bis-[O-ethyl-(3,5-di-tert-butyl-4-hydroxybenzyl)-phosphonate]

328 g (1 mol) of O-ethyl-4-hydroxy-3,5-di-tert-butylbenzylphosphonic acid is suspended in 2.5 liters of water, and the suspension is neutralised with 100 ml of 10N sodium hydroxide solution (pH 6.5). There is formed a clear solution, to which is added dropwise at room temperature, within 45 minutes, a solution of 123 g (0.525 mol) of calcium nitrate tetrahydrate in 130 ml of water. The precipitate occurring in crystalline form is filtered off with suction, washed with 500 ml of water, and subsequently dried for 14 hours at 70° C. under a pressure of 11 mm Hg. There is obtained in this manner calcium-bis-[O-ethyl-(3,5-di-tert-butyl-4-hydroxybenzyl)-phosphonate] in the form of colourless crystals.

Elementary analysis: calculated: C 58.75%, H 8.12%, P 8.92%, Ca 5.76%; found: C 58.69%, H 8.20%, P 8.81%, Ca 5.43%.

The same compound is obtained also by suspending 328 g (1 mol) of O-ethyl-4-hydroxy-3,5-di-tert-butylbenzylphosphonic acid and 28 g (0.5 mol) of calcium oxide in 6 liters of 50% aqueous ethanol; and then refluxing the mixture until a clear solution has formed. In order to isolate the formed calcium salt of the stated acid, the solution is concentrated by evaporation to about 1/6 of its volume, in the course of which this salt gradually separates out as a crystalline precipitate, which is dried in the manner described above.

EXAMPLE 2

1000 parts of unstabilised polypropylene powder (melt index ~20) are mixed in a high-speed mixer with 1 part of calcium stearate and 2.5 parts of a delustering agent ($TiO_2$ Rutil), as well as with the respective additives listed in the Table which follows, and the mixture is subsequently extruded at a maximum of 220° C. and granulated. The granulate obtained is spun on a laboratory extruder-spinning apparatus at a maximum of 280° C. into the form of multifilaments, and these are stretched on a draw twister to give a final value of 130/37 Denier and a residual elongation of 30%. These multifilaments are in each case wound at 4 positions onto cardboard to form so-called yarn surfaces, and the Yellowness Index values (YI) according to ASTM 1925-70 are measured on these surfaces (lower numbers indicate better colours).

The results are summarised in Table I.

TABLE I

| Additives | YI |
|---|---|
| none | 2.71 |
| 0.1% Ca(L)$_2$ | 1.96 |
| 0.2% Ca(L)$_2$ | 1.90 |
| 0.1% Ba(L)$_2$ | 2.74 |
| 0.2% Ba(L)$_2$ | 2.41 |
| 0.1% H(L) | 3.50 |
| 0.2% H(L) | 2.68 |
| 0.1% Ni(L)$_2$ | 3.97 |
| 0.2% Ni(L)$_2$ | 4.08 |
| 0.1% Zn(L)$_2$ | 2.68 |
| 0.2% Zn(L)$_2$ | 2.59 |

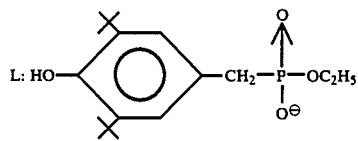

wherein the + is t-butyl.

EXAMPLE 3

1000 parts of unstabilised polypropylene powder (melt index ~20) are mixed in a high-speed mixer with 1 part of calcium stearate, 2.5 parts of a delustering agent (TiO$_2$ Rutil) and 6 parts of dilaurylthiodipropionate, as well as with the respective additives shown in Table II, and the mixture is subsequently extruded at a maximum of 220° C. and then granulated. Preparation of the multifilaments and the measurement of the Yellowness Index values (YI) are carried out as described in Example 2.

The results are summarised in Table II.

TABLE II

| Additives | YI |
|---|---|
| none | 2.16 |
| 0.2% Ca(L)$_2$ | 1.53 |
| 0.2% Ba(L)$_2$ | 2.17 |
| 0.2% H(L) | 2.37 |
| 0.2% Ni(L)$_2$ | 5.00 |
| 0.2% Zn(L)$_2$ | 2.75 |

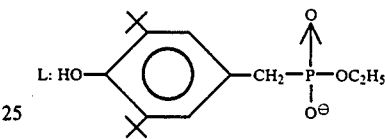

wherein the + is t-butyl.

What we claim is:

1. A polypropylene composition containing an effective stabilizing amount of calcium-bis-[O-ethyl-(3,5-di-tert.butyl-4-hydroxybenzyl)-phosphonate].

2. A polypropylene composition according to claim 1, which is in the form of polypropylene filaments, fibres or films.

* * * * *